United States Patent
Alexander et al.

(10) Patent No.: US 6,779,745 B2
(45) Date of Patent: Aug. 24, 2004

(54) UNIVERSAL PRESSURE WASHER EXTENSION/REPLACEMENT HOSE

(75) Inventors: Gus Alexander, Inverness, IL (US); Morgan McCarthy, Schaumburg, IL (US); John Pianetto, Hoffman Estates, IL (US)

(73) Assignee: FAIP North America, Inc., Elk Grove Village, IL (US)

( * ) Notice: Subject to any disclaimer, the term of this patent is extended or adjusted under 35 U.S.C. 154(b) by 57 days.

(21) Appl. No.: 10/338,225

(22) Filed: Jan. 8, 2003

(65) Prior Publication Data

US 2004/0140376 A1 Jul. 22, 2004

(51) Int. Cl.$^7$ .............................................. B05B 15/08
(52) U.S. Cl. ...................... 239/588; 239/152; 239/124; 239/526; 239/600; 138/155; 285/921
(58) Field of Search ................................ 239/124, 128, 239/152–154, 525, 526, 588, 600; 285/8, 399, 401, 328, 921; 138/120, 155

(56) References Cited

U.S. PATENT DOCUMENTS

| 4,030,778 | A | * | 6/1977 | Kaut, Jr. ......................... 285/8 |
| 5,174,610 | A | * | 12/1992 | Svendsen et al. ............ 285/401 |
| 5,263,646 | A | * | 11/1993 | McCauley ................... 239/526 |
| 5,301,877 | A | * | 4/1994 | Madison ..................... 239/154 |
| 5,624,074 | A | * | 4/1997 | Parisi ......................... 239/588 |
| 5,964,409 | A | | 10/1999 | Alexander et al. |
| 6,619,570 | B1 | * | 9/2003 | Ericksen et al. ............ 239/600 |

* cited by examiner

Primary Examiner—Steven J. Ganey
(74) Attorney, Agent, or Firm—Leydig, Voit & Mayer, Ltd (57) ABSTRACT

A universal pressure washer extension/replacement hose adapted for use with pressure washers which have different diameter liquid discharge outlets. The extension hose has identical connecting fittings at its opposite ends, one of which can be coupled in sealed relation to a pressure washer outlet of either of two known sizes and the other of which is connectable to a spray gun hose through a universal adaptor having connecting chambers of said two known sizes.

28 Claims, 5 Drawing Sheets

Fig. 2. PRIOR ART

SEE FIG. 3.

UNIVERSAL PRESSURE WASHER EXTENSION/REPLACEMENT HOSE

FIELD OF THE INVENTION

The present invention relates generally to pressure washers, and more particularly, to high pressure hoses and couplings used for connecting a spray control gun to the pressure washer.

BACKGROUND OF THE INVENTION

Pressure washers are commonly used for washing surfaces such as wood, tile, concrete and the like of difficult to remove stains or finishes. Pressure washers typically comprise a portable gas or electric powered pump that is connected to a liquid supply for generating a high pressure liquid discharge at the outlet thereof, a spray gun for controlling a discharging spray, and a high pressure hose connecting the spray gun to the pressure washer outlet for enabling the user to move with the spray gun within a fixed range of the pressure washer as determined by the length of the hose, which typically is on the order of 15 to 25 feet. While pressure washers originally were designed primarily for commercial usage, such as use by painters, landscapers and the like, today pressure washers are a common household product available at relatively low cost at numerous retail stores.

Because of the ever increasing usage of pressure washers, consumers have found the need for longer pressure hoses for connecting the spray gun to the pressure washer than originally supplied with the pressure washer. For example, when working on the roof of a home, it is desirable to have a hose long enough to enable the user to freely move about the roof while the pressure washer remains at ground level. While it is known to connect an extension hose between the pressure washer and the existing spray gun hose to increase the range of movement of the user with the spray gun, finding the proper extension hose for a particular pressure washer can be confusing and frustrating to the consumer. The difficulty arises by reason of consumer-type pressure washers being manufactured with two different universally used discharge outlet sizes. Many pressure washers to have a liquid discharge outlet that is 14 mm. in diameter, while other commonly sold pressure washers have a liquid discharge outlet that is 15 mm. in diameter. To obtain an extension hose for a pressure washer with a 14 mm. discharge orifice, the consumer must find and select the extension hose with the proper sized fitting, as well as a proper sized adaptor for connecting the extension hose to the existing spray gun hose. This sometimes it can be difficult in a particular retail outlet. Moreover, it is costly for manufacturers to design and manufacture a multiplicity of different extension hoses and connector adaptors for pressure washers with different sized discharge outlets and inefficient for retailers to maintain an inventory of such extension hoses and adaptors for the different sized pressure washers.

Because pressure washers commonly are inexpensively manufactured for the consumer market, it also is not uncommon for pressure washer hoses to become damaged or abused during usage, requiring their replacement. Again, it has been difficult for customers to make the proper replacement and costly for the retailers to maintain an inventory of different sized replacement hoses with the proper sized fittings.

OBJECTS AND SUMMARY OF THE INVENTION

It is an object of the present invention to provide a pressure washer extension hose that is adapted for use with pressure washers having a multiplicity of different sized liquid discharge outlets. More particularly, it is an object to provide a pressure washer extension hose that may be used with pressure washers which have either 14 mm. or 15 mm. sized discharge outlets.

Another object is to provide a replacement hose which is adaptable for use on pressure washers with different sized liquid discharge outlets.

A further object is to provide a high pressure hose of the foregoing type that can be used as an extension or replacement hose for pressure washers.

Another object is to provide a pressure washer extension and replacement hose of the above kind which is adapted for economical manufacture and which minimizes inventory requirements of retailers.

Still a further object is to provide pressure washer extension and replacement hose of such type which have novel fittings adapted for sealing engagement with different sized pressure washer and spray gun hose connecting fittings.

Yet another object is to provide a pressure washer hose which has a multipurpose connecting fitting with improved sealing characteristics.

Another object is to provide a novel connecting adaptor that is effective for connecting pressure washer hoses with different sized hose fittings.

Other objects and advantages of the invention will become apparent upon reading the following detailed description and upon reference to the drawings, in which:

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENTS

Figure 1:
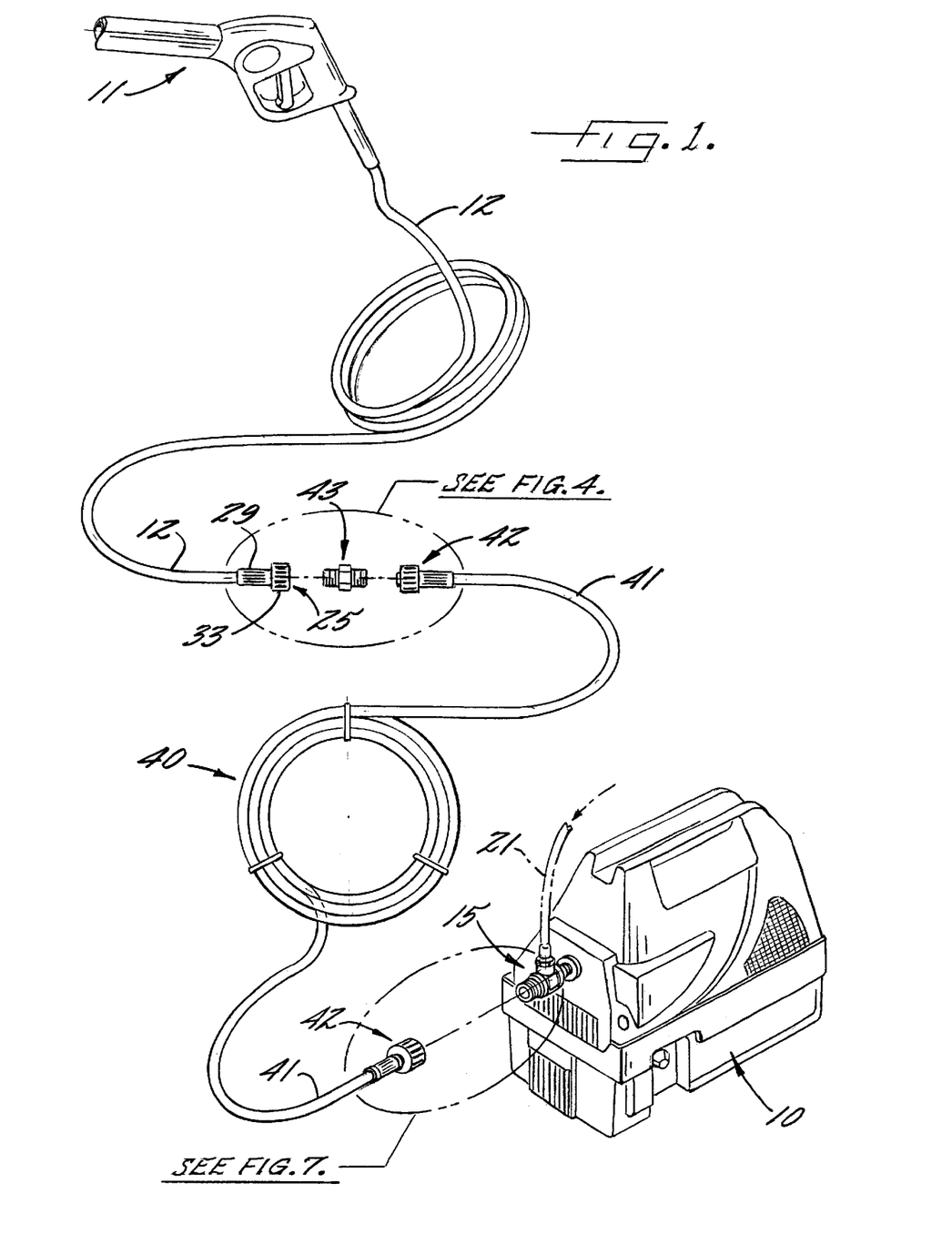
FIG. 1 is an exploded perspective of pressure washer with an extension hose in accordance with the invention connected between the pressure washer and a spray gun hose.
Figure 3:
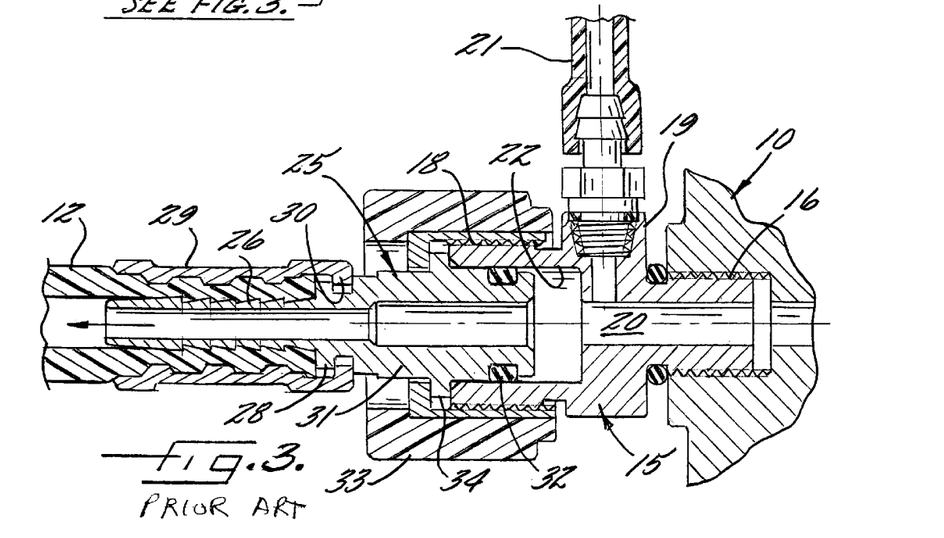
FIG. 3 is an enlarged fragmentary section of the pressure washer connection shown in FIG. 2.

Referring now more particularly to FIG. 1 of the drawings, there is shown an illustrative pressure washer 10 having a spray gun 11 with a flexible high pressure hose 12 adapted for releasable connection to an outlet fitting 15 of the pressure washer 10. The illustrated spray gun 11 is permanently secured to the downstream end of a flexible pressure washer hose 12, which may be of a flexible reinforced construction of a known type suitable for withstanding liquid pressures generated by the pressure washer. The pressure washer 10 may be of a conventional type which has a gasoline or electric powered motor for operating a pump to generate a high-pressure liquid discharge. The pressure washer outlet fitting 15, as depicted in FIG. 3, has a threaded upstream end 16 connected in fluid communication with liquid discharge piping from the pump and an externally threaded, hose connecting, outlet end 18. The illustrated pressure washer outlet fitting 15 has an auxiliary fluid inlet stem 19 communicating in perpendicular relation with a liquid discharge flow passage 20 through the fitting 15 for enabling siphoning of cleaning fluids, chemicals or the like supplied from an auxiliary fluid hose 21 into the liquid discharge flow stream as it is emitted from the pressure washer. A liquid discharge outlet of the pressure washer 10 in this case is defined by a cylindrical chamber 22 in the outlet end 18 of the fitting 15 which communicates with the flow passage 20.

Figure 2:
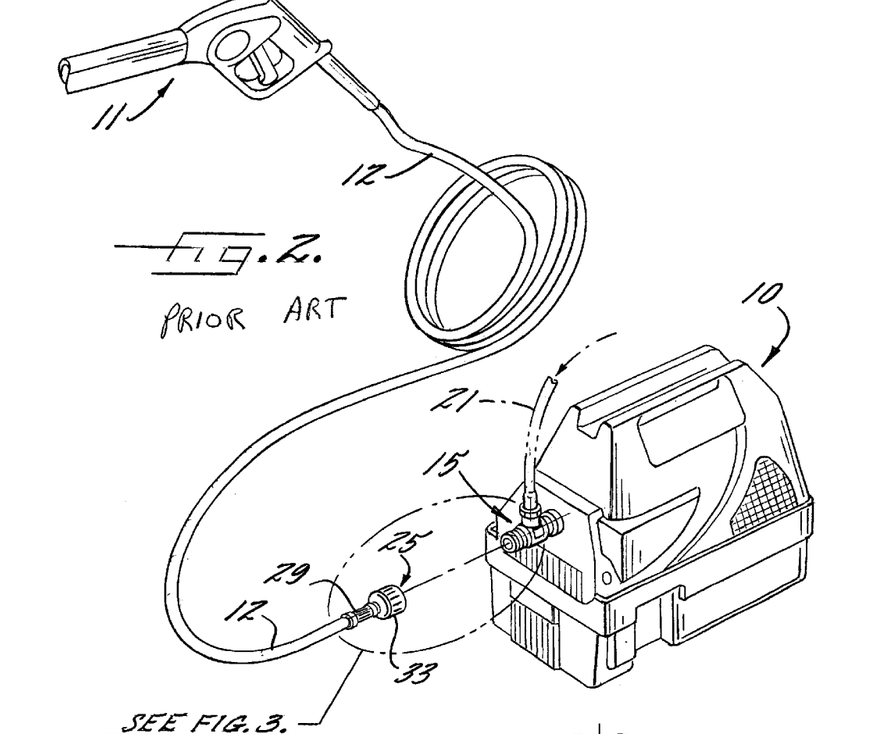
FIG. 2 is an exploded perspective of the spray gun hose connected to the pressure washer in a conventional manner.

For enabling the connection of the spray gun hose 12 to the pressure washer 10, as depicted in FIGS. 2 and 3, such as upon initial purchase, the spray gun hose 12 has a fitting 25 fixedly secured to the upstream end thereof. The fitting 25, which also is of a conventional type, has a ribbed shank 26 that is forcefully positioned into the end of the hose 12 up to and against a radial locating flange 28 of the fitting 25. For positively securing the fitting 25 in the hose, an annular ferrule 29 positioned about the end of the hose and has an annular retaining flange 30 that is deformed into an annular retaining groove of the fitting immediately adjacent the locating flange 28. The fitting 25 has an outwardly-extending connecting stem 31 which carries an O-ring 32 within and outwardly opening annular groove. The stem 31 is sized for positioning within the discharge outlet-defining chamber 22 of the pressure washer with the O-ring 32 in interposed sealing engagement therebetween. For securing the hose to the outlet fitting 25, a threaded retainer ring 33 is provided about the end of the hose, which engages a radially extending retaining flange 34 and draws it into captive position as an incident to threaded engagement of the retainer ring 33 onto the pressure washer outlet fitting 15.

In order for a user of the pressure washer to move with the spray gun 11 a distance greater than the length of the pressure washer hose 12, an extension hose 40 is connectable between the pressure washer 11 and the spray gun hose 12. As depicted in FIG. 1, the illustrated extension hose 40 comprises a length of connector high pressure hose 41 with connection fittings 42 at its opposite ends, one of which is connectable to the pressure washer outlet fitting 15 and the other of which is connectable to the spray gun hose fitting 25 by means of a connecting adaptor 43.

As indicated above, the outlet fittings of pressure washers, and particularly pressure washers designed for the consumer market, do not have standardized discharge outlets. One common pressure washer discharge outlet size is 14 mm., while another common discharge outlet size is 15 mm. The slightly different discharge outlet sizes heretofore have been a source of confusion to consumers who wish to purchase extension hoses and connecting adaptors for their existing pressure washers, as well as a costly burden to manufacturers in designing and manufacturing a multiplicity of different sized extension hoses and connecting adaptors, which also increases inventory requirements for retailers. To assist in understanding of certain of the following discussions, references to pressure washers having a 14 mm. discharge outlet and components designed for use therewith sometimes are designated with the appropriate reference numeral and the distinguishing suffix "S" (for small or 14 mm.). The larger 15 mm. pressure washer discharge outlet and components designed for use therewith sometimes are designated with the appropriate reference numeral with the distinguishing suffix "L" (for large or 15 mm.).

In accordance with the invention, an extension hose is provided that can be used with pressure washers having a plurality of different sized discharge outlets. More particularly, the illustrated extension hose 40 is adapted for connection between pressure washers 10 and existing spray gun hoses 12 which have either 14 mm. or 15 mm. connecting fittings. The connecting fittings 42 of the extension hose 40 in this case are identical in construction, each comprising a hose connecting stem 44 at one end, a mating portion 45 at the other end, and an outwardly extending retaining flange 46 The hose connecting stem 44 is a relatively small diameter ribbed member over which the hose is forcefully positioned into abutting relation to a locator flange 48. For positively affixing the stem 44 to the hose 41, a ferrule 49 of a known type is provided, which has a radial end wall 50 that is crimped cramped or otherwise forced inwardly into an annular groove of the fitting 42 with the hose interposed therebetween.

Figure 6:
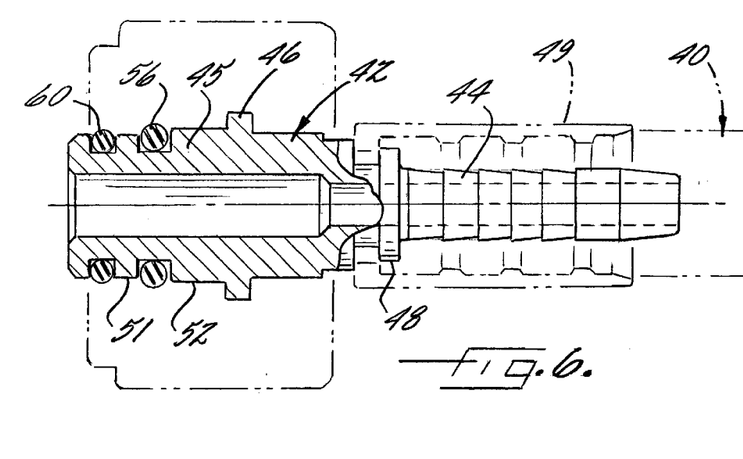
FIG. 6 is a fragmentary section of a connecting fitting at one end of the extension hose.

In carrying out the invention, the mating portion 45 of the extension hose fitting 42 is adapted for mating in sealed relation with different sized pressure washer outlets, namely, in the illustrated embodiment, a discharge outlet 22 that is 14 mm. in diameter or a discharge outlet that is 15 mm. in diameter. To this end, the mating portion 45 of the extension hose fitting 42 (as shown in FIG. 6) has a first hub portion 51 at its terminal end adapted for insertion into operative sealed relation with a pressure washer fitting having a relatively smaller diameter outlet (i.e. 14 mm.) and a second hub portion 52 intermediate the first hub portion and a retaining flange 54 of the fitting designed for insertion into operative sealed relation with a pressure washer fitting having a relatively larger sized outlet (i.e. 15 mm.). The second hub portion 52 is larger in diameter than the first hub portion 51, and preferably has a diameter greater than 14 mm.

Figure 7:
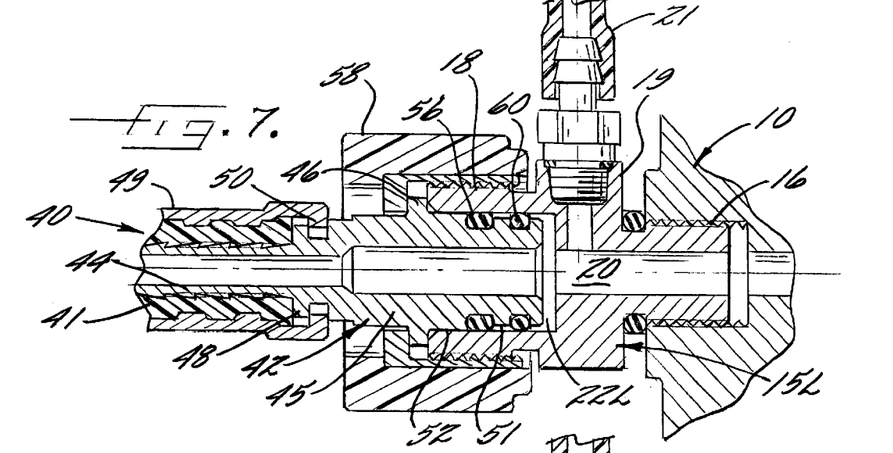
FIG. 7 is an enlarged fragmentary section of the connection of the extension hose to a pressure washer having a relative large size (i.e. 15 mm.) liquid discharge outlet.

When the extension hose fitting 42 is connected to a pressure washer fitting having the relatively large sized discharge outlet 22L, as depicted in FIG. 7, both the hub portions 51, 52 are positionable into the pressure washer outlet chamber 22L with the retaining flange 46 in abutting relation to an end wall of the pressure washer fitting 15L. For establishing a liquid seal between the connecting portion 45 and the pressure washer fitting 15L, a first relatively large diameter O-ring 56 is tensioned about an annular groove immediately of adjacent the smaller diameter hub portion 51 of the fitting. The O-ring 56 is sized so as to be larger than the diameter hub portion 52 so as to be compressed into sealing engagement with the cylindrical chamber 22L of the pressure washer fitting 15L. A threaded retainer ring 58 on the end of the extension hose secures the extension hose fitting 42 in mounted position on the pressure washer 10.

Figure 8:
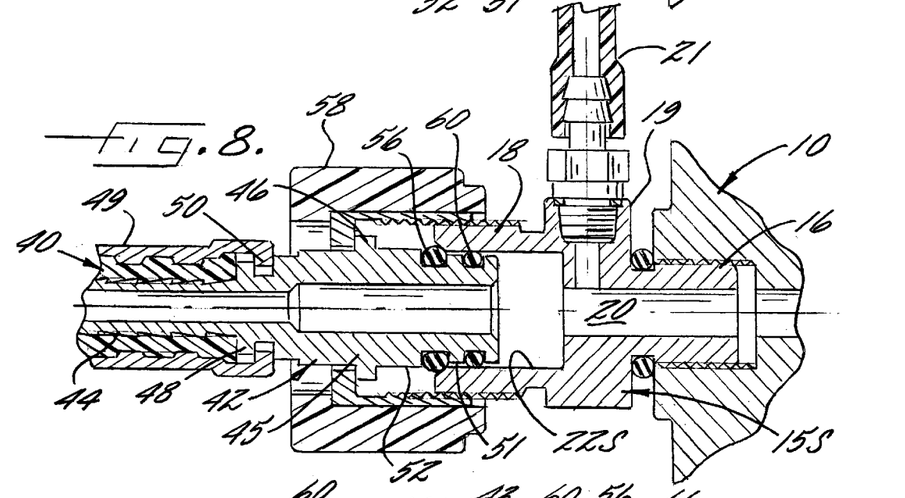
FIG. 8 is an enlarged fragmentary section of the connection of the extension hose to a pressure washer hose having a relatively smaller size (i.e. 14 mm.) discharge outlet.

In keeping with the invention, when the extension hose fitting 42 is matable with the relatively smaller diameter pressure washer discharge outlet 22S, as depicted in FIG. 8, only the first smaller diameter hub portion 51 of the fitting 42 is positionable into the discharge outlet 22S. For effecting a seal between the extension hose fitting 42 and the pressure washer fitting 15S in this case, the smaller diameter hub portion 51 is formed with an annular groove which carries a second O-ring 60, having a smaller effective outer sealing diameter. In this case, the smaller effective outer sealing diameter of the second O-ring 60 is achieved by using an O-ring which has a smaller cross-sectional diameter. Upon positioning of the first smaller diameter hub portion 51 of the fitting 42 into the pressure washer fitting 15S, the O-ring 60 is compressed into tight sealing engagement with the internal cylindrical chamber 22S.

In carrying out a further feature of the invention, when the extension hose 40 is used with the smaller diameter pressure washer outlet fitting 15S, as depicted in FIG. 8, the O-ring 56 with the larger effective diameter is biased into redundant sealing engagement with the pressure washer fitting 15S. Preferably, the larger diameter hub portion 52 of the extension hose fitting 42 is slightly larger in diameter than the pressure washer fitting outlet chamber 22S such that upon positioning of the smaller diameter hub portion 51 into the pressure washer outlet 22S, the larger O-ring 56 is biased into sealing engagement with the outlet end 18 of the fitting 15S. The threaded retaining ring 58 again secures the extension hose onto the pressure washer fitting.

Figure 5:
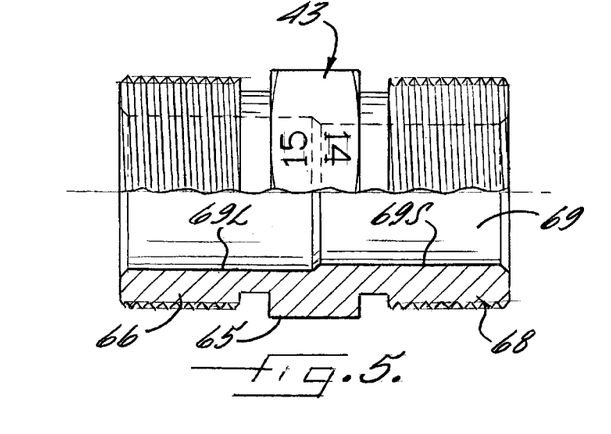
FIG. 5 is an enlarged, fragmentary section of the connecting adaptor shown in FIG. 4.

In accordance with another important aspect of the invention, the adaptor 43 has a universal design adapted for connecting the identical extension hose fittings 42 of the extension hose to the existing spray gun hose fitting 25, whether or not the spray gun hose connection is designed for use with the smaller diameter (14 mm.) pressure washer outlet fitting 15S or to the relatively larger diameter (15 mm.) pressure washer outlet fitting 15L. To this end, as shown in FIG. 5, the illustrated adaptor 43 has a central hub portion 65 with externally threaded cylindrical extensions 66, 68 of common diameter extending coaxially outwardly from opposite sides of the hub 65. The adaptor 43 is formed with an axial flow passage 69 which in this case comprises two separate cylindrical chamber portions 69S, 69L each communicating with each other from opposite ends of the adaptor. The chamber 69S has a relatively small diameter (i.e. 14 mm.) corresponding to the smaller diameter pressure washer outlet 22S and the second chamber 69L has a relatively larger diameter (i.e. 15 mm.) corresponding to the discharge outlet 22L of the relatively larger diameter pressure washer fitting 15L.

Figure 4:
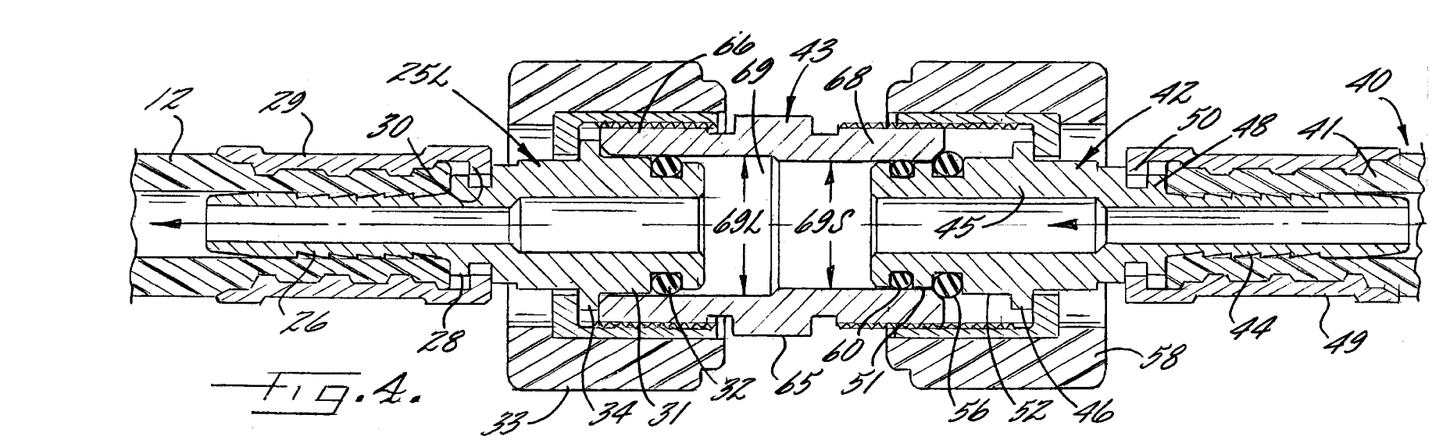
FIG. 4 is an enlarged fragmentary section showing the connection between the extension hose and pressure washer hose by means of a connecting adaptor in accordance with the invention.

In carrying out this particularly novel aspect of the invention, when the extension hose 40 is used with a pressure washer having the larger diameter 15 mm. outlet fitting 15L to which the connection fitting 42 at one end of the extension hose is connected in the manner described above and shown in FIG. 7, the connecting fitting 42 at the opposite end of the extension hose is connected to the second relatively small diameter chamber 69S of the adaptor 43, as depicted in FIG. 4, and secured thereto by a respective retaining ring 58. Similar to when the fitting 42 is connected to the smaller diameter pressure washer fitting 15S (i.e. 14 mm.), only the smaller diameter hub portion 51 of the extension hose fitting is positioned within the smaller diameter chamber 69S with the seal 60 in sealing contact with the chamber portion 69S and with the relatively larger diameter O-ring 56 forming a redundant seal with the end 68 of the adaptor 43. The opposite larger diameter chamber 69L of the adaptor 43 can then receive the larger diameter (15 mm.) fitting 25L of the spray gun hose 12, which had been secured to the pressure washer, and be secured thereto by the retaining ring 33 in identical fashion to the manner in which the spray gun hose 12 is connected to the pressure washer without the extension hose (see FIGS. 2 and 3).

Figure 9:
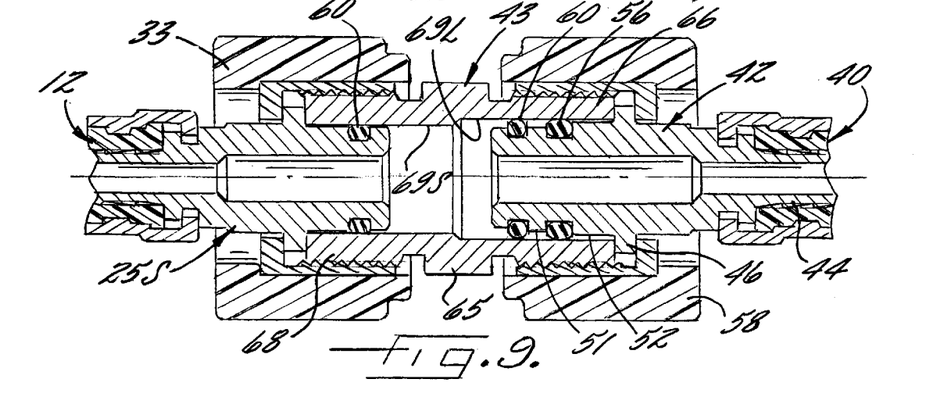
FIG. 9 is a fragmentary section showing the connection of the extension hose and adaptor in accordance with the invention to a spray gun hose originally adapted for connection to a relatively smaller sized (i.e. 14 mm.) pressure washer outlet.

When the extension hose 40 is to be used with a pressure washer having the relatively smaller diameter (i.e. 14 mm.) outlet fitting 15S, it can be seen that the spray gun hose may be disconnected from the pressure washer, and the extension hose 40 can be connected to the pressure washer fitting with a redundant sealing arrangement as depicted in FIG. 8. The opposite end of the extension hose 40 may be coupled to the larger diameter chamber 69L of the adaptor 43 with the hub portions 51, 52 positioned and retained within the larger diameter chamber 69L of the adaptor, as depicted in FIG. 9. The smaller diameter fitting 25S of the spray gun hose 12, which had been connected to the pressure washer, may then be connected with the smaller diameter chamber 69S of the adaptor 43, as depicted in FIG. 9.

It will be appreciated by one skilled in the art that the extension hose 40 and adaptor 43 have significant advantages over prior art extension hoses and adaptors. In the prior art, extension hoses and adaptors must be designed, manufactured and made available in retail outlets for each different size pressure hose outlet fitting. The extension hose and adaptor of the present invention may be used with pressure washers having either of the two commonly available sized outlet fittings (i.e. 14 mm. or 15 mm.). Hence, the consumer may more easily locate and purchase an extension hose that is usable with his pressure washer. Moreover, since the extension hose connecting fittings 42 are identical in construction and can be used with pressure washers with either sized discharge fitting (i.e. 14 mm. or 15 mm.), significant economic advantages are achieved. The manufacturer need only design, engineer, and manufacture extension hoses and adaptors of a single design. Likewise, the retail outlet need only carry a single extension hose and adaptor for pressure washers, substantially reducing inventory requirements.

Figure 10:
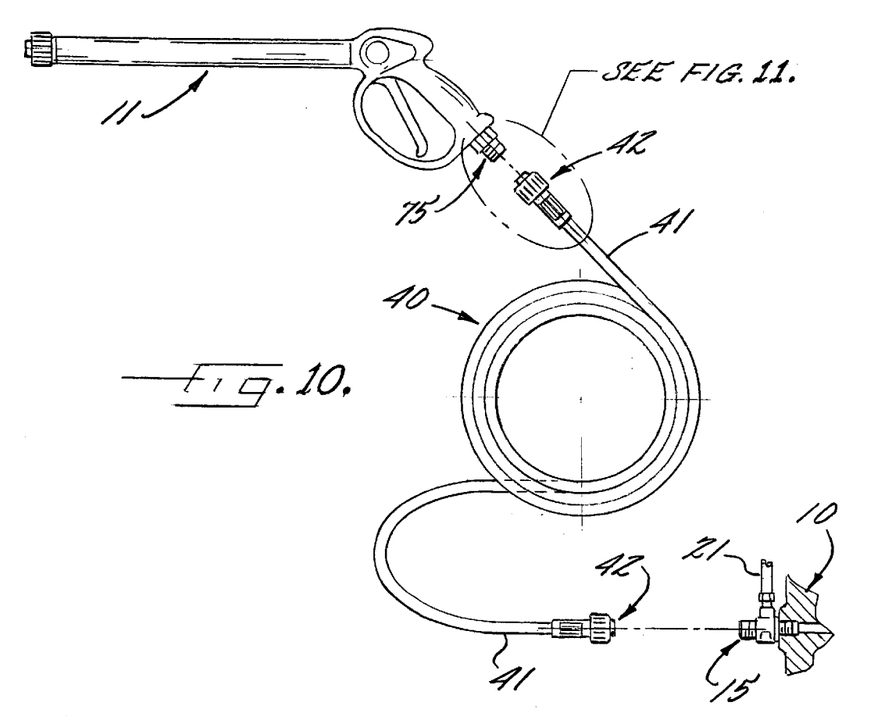
FIG. 10 is a depiction of the extension hose in accordance with the invention being used as a replacement hose between a spray gun and a pressure washer.
Figure 11:
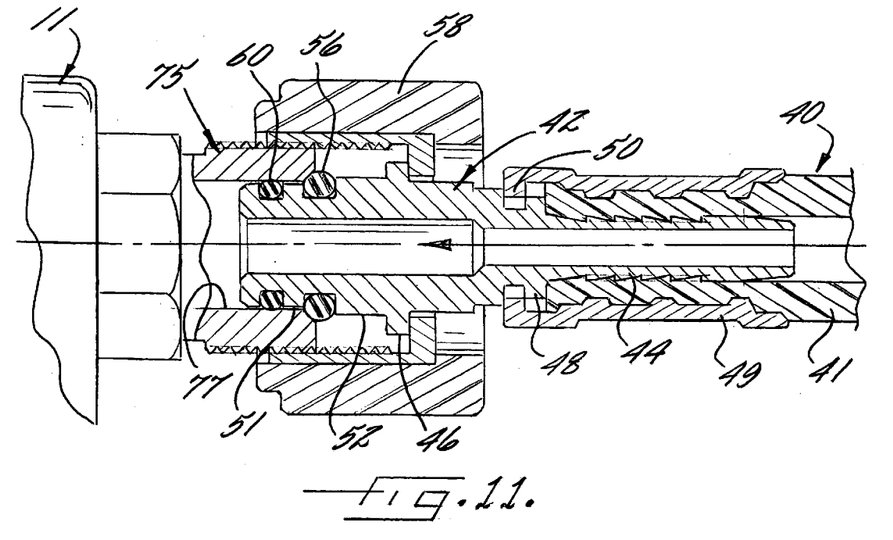
FIG. 11 is an enlarged fragmentary section showing the replacement hose in FIG. 10 being connected to a spray gun having a relatively smaller sized (i.e. 14 mm.) connecting fitting.

Referring now more particularly to the FIGS. 10–11, there is shown a spray gun 11 which has an inlet fitting 75 having a liquid inlet defined by a cylindrical chamber 77, similar to and sized the same as the discharge outlet chamber 22 of the pressure washer fitting 15. It will be understood that the pressure washer hose supplied with the pressure washer and spray gun would have identical connecting fittings 25 at its opposite ends for connection to the spray gun and pressure washer fittings 25, 15, respectively, in a manner similar to that depicted in FIG. 2. Typically, the pressure washer and spray gun fittings 15, 75 would have a similarly sized relatively small diameter (14 mm.) outlet and inlet 22S, 77 or relatively large diameter (15 mm.) outlet and inlet 22L, 77.

In accordance with a further aspect of the invention, the pressure washer extension hose 40 can be used as a replacement hose for pressure washers 10 and spray guns 11 having either the 14 mm. or 15 mm. liquid outlets and inlets, 22, 77 such as a result of damage to the pressure washer hose originally supplied with the pressure washer or the desire or need to use a different length hose. If the pressure washer 10 and spray gun 11 have the smaller size (14 mm.) liquid outlets and inlets 22S, 77, the extension hose 40 would connect to the pressure washer and spray gun in a manner similar to that depicted in FIGS. 8 and 11. If the pressure washer and spray gun had a relatively larger sized liquid outlet and inlet 22L, 77, the replacement hose 40 would connect to the respective pressure washer and spray gun fittings 15L, 75 in a manner similar to that depicted in FIG. 7. Hence, the same hose 40 can be purchased and used as an extension hose or a replacement hose for pressure washers with either commonly sized liquid discharge outlet or outlets.

What is claimed is:

1. A pressure washer hose adapted for connection to pressure washers having liquid discharge outlet fittings which define liquid discharge outlets of different diameters comprising a pressure hose segment with connecting fittings at opposite ends, one of said connecting fittings having a first hub portion effective for sealed coupling of the pressure washer hose segment with a pressure washer outlet fitting having a first relatively small diameter liquid discharge outlet, said one connecting fitting having a second hub portion relatively larger in diameter than said first hub portion effective for sealed coupling of the pressure hose segment to a pressure washer liquid discharge outlet having a second relatively large diameter greater than the diameter of said first outlet.

2. The pressure washer hose of claim 1 including a first sealing member adapted for sealing engagement between said one hose connecting fitting and said first relatively small diameter pressure washer outlet when said first hub portion is coupled to said relatively small diameter outlet, and a second sealing member adapted for sealing engagement between said one hose connecting fitting and said second relatively large pressure washer outlet when said second hub portion is coupled to said second relatively large diameter pressure washer outlet.

3. The pressure washer of claim 2 in which said second sealing member is adapted for sealing engagement between said one hose connecting fitting and said pressure washer outlet fitting when said first hub portion is coupled to said first relatively small diameter outlet for forming a redundant seal.

4. The pressure washer hose of claim 2 in which said one hose connecting fitting includes a stem at one end for connection to the hose segment and a mating portion at the opposite end which includes said first and second hub portions.

5. The pressure washer hose of claim 4 in which said first and second sealing members are mounted on said mating portion.

6. The pressure washer hose of claim 2 in which said first sealing member is a first O-ring having a relatively small effective sealing diameter, and said second sealing member is a second O-ring having an effective sealing diameter greater than first O-ring.

7. The pressure washer hose of claim 6 in which said second O-ring has a transverse cross-sectional diameter greater than a cross-sectional diameter of the first O-ring.

8. The pressure washer hose of claim 6 in which said first O-ring is mounted in close relation to said first hub portion, and said second O-ring is mounted in close relation to said second hub portion.

9. The pressure washer hose of claim 8 in which said first O-ring is disposed about said first hub portion, and said second O-ring is mounted adjacent an end of said second hub portion.

10. The pressure washer hose of claim 2 in which said first sealing member sealingly engages an inner cylindrical wall of the pressure washer outlet fitting when said one connecting fitting is coupled to said first relatively small diameter pressure washer outlet, and said second sealing member sealingly engages an inner cylindrical wall of the pressure washer outlet fitting when said one connecting fitting is coupled to said second relatively large diameter pressure washer outlet.

11. The pressure washer hose of claim 10 in which said second sealing member sealingly engages and forms a redundant seal with an end of the pressure washer fitting when said one connecting fitting is coupled to said relatively small diameter outlet.

12. The pressure washer hose of claim 1 in which a second of said hose connecting fittings at an end of the hose segment opposite said one connecting fitting has a first relative small diameter hub portion and a second relatively large diameter hub portion having a diameter greater than the first hub portion, and an adaptor to which said second connecting fitting is coupled when said hose segment is used as an extension hose for coupling between said pressure washer outlet fitting and a fitting of a spray gun hose having a hub portion sized for coupling with said pressure washer outlet fitting.

13. The pressure washer hose of claim 12 in which said adaptor has a flow passage therethrough which includes a first chamber communicating with one end of said adapter having a relatively small diameter and a second chamber in communication with an opposite end of said adaptor having a relatively large diameter greater than the diameter of said first adaptor chamber, and said second hub portion of said second connecting fitting being adapted for sealed coupling with said second relatively large chamber of said adaptor when said one connecting fitting is coupled to a pressure washer fitting having said first relatively small diameter outlet, and said first hub portion of said second connecting fitting being adapted for seal coupling with said first relatively smaller diameter chamber of said adapter when said one connecting fitting is coupled to said pressure washer fitting having said relatively large diameter outlet.

14. A spraying apparatus comprising:
a power operated pressure washer unit adapted for generating a high pressure liquid discharge at an outlet fitting having an outlet of first predetermined size, a spray gun having a liquid supply hose with an inlet fitting at an upstream end sized for coupling with said pressure washer fitting outlet, an extension hose having connecting fittings at opposite ends for coupling between said spray gun hose fitting and said pressure washer fitting, said connecting fittings each including a first hub portion effective for sealed coupling of the extension hose with the pressure washer fitting outlet and a second hub portion sized different from said first hub portion effective for sealed coupling with a pressure washer fitting having an outlet of a second size different from said first size, an adaptor for coupling between one of said extension hose connection fittings and said spray gun hose fitting, said adaptor having a liquid flow passageway extending therethrough which includes a first chamber of said first size and a second chamber of said second size, and one of said extension hose fittings being connectable to the pressure washer fitting with the first hub portion in sealed engagement with said pressure washer fitting outlet and said other connecting fitting being coupled to said adaptor with the second hub portion thereof in sealed engaging relation with said second adaptor chamber, and said spray gun hose fitting being coupled in sealed relation to the first adaptor chamber.

15. The spray apparatus of claim 14 in which said pressure washer fitting outlet is defined by a cylindrical chamber in said pressure washer fitting which has the same diameter as said first adaptor chamber.

16. The spray apparatus of claim 15 in which said second adaptor chamber is larger in diameter than said first adaptor chamber and said pressure washer fitting chamber.

17. The spray apparatus of claim 15 in which said first adaptor chamber is smaller in diameter than said first adaptor chamber and said pressure washer fitting chamber.

18. The spray apparatus of claim 15 in which said spray gun hose fitting and said extension hose connecting fittings each have a respective outwardly extending hub portion with at least one externally positioned sealing ring for positioning into respective chambers of said adaptor and pressure washer fitting.

19. The spray apparatus of claim 15 in which each said extension hose connecting fitting has a pair of sealing members, one of said sealing members being adaptable for sealing engagement with a cylindrical chamber of said first diameter, and the other said sealing members being adapted for sealing engagement with a chamber of said second diameter.

20. The spray apparatus of claim 19 in which said sealing members of each extension hose connecting fitting have different effective sealing diameter.

21. The spraying apparatus of claim 15 in which each said extension hose connecting fitting has a first hub portion effective for sealed coupling with a cylindrical chamber of said first diameter and a second hub portion adapted for sealed coupling with a cylindrical chamber of said second diameter.

22. A spraying apparatus comprising:
a power operated pressure washer unit adapted for generating a high pressure liquid discharge, a spray gun hose having a liquid supply hose, an extension hose for coupling to said pressure washer, an adaptor for coupling between said pressure washer and said spray gun hose for enabling said extension hose to increase the range of movement of said spray gun relative to said pressure washer unit, said adaptor having a liquid flow passageway extending therethrough which includes a first cylindrical chamber communicating with one end of the adaptor which has a first diameter and a second cylindrical chamber communicating with an opposite end of said adaptor having a second diameter different from said first diameter, said pressure washer having a liquid discharge fitting with an outlet defined by a cylindrical chamber of said first diameter, said spray gun hose having an inlet fitting at an upstream end thereof adapted for sealed coupling with said pressure washer fitting outlet, said extension hose having identical connecting fittings at opposite ends thereof which each are adapted for sealed coupling with a cylindrical chamber having either said first diameter or said second diameter, one of said extension hose connecting fittings being coupled in sealed relation to said pressure washer outlet defined by said cylindrical chamber of said first diameter, the other of said extension hose connecting fittings being coupled in sealed relation to said second adaptor chamber having said second diameter, and said spray gun hose inlet fitting being coupled in sealed relation to said first adaptor chamber having said first diameter.

23. The spray apparatus of claim 22 in which said second adaptor chamber is sized larger than said first chamber.

24. The spray apparatus of claim 22 in which said second adaptor chamber is sized smaller than said first adaptor chamber.

25. The spray apparatus of claim 22 in which said pressure washer fitting outlet is sized smaller than said second adaptor chamber.

26. The spray apparatus of claim 22 in which said pressure washer fitting outlet is sized larger than said second adaptor chamber.

27. The spray apparatus of claim 22 in which each said extension hose connecting fitting has a pair of sealing members, one of said sealing members being adaptable for sealing engagement with a cylindrical outlet or chamber of said first diameter, and the other said sealing members being adapted for sealing engagement with an outlet or chamber of said second diameter.

28. The spraying apparatus of claim 22 in which each said extension hose connecting fitting has a first hub portion effective for sealed coupling with a cylindrical chamber or outlet of said first diameter and a second hub portion adapted for sealed coupling with a cylindrical chamber or outlet of said second diameter.

* * * * *